(12) United States Patent
Su

(10) Patent No.: US 11,188,551 B2
(45) Date of Patent: Nov. 30, 2021

(54) MULTI-LEVEL DATA PAGINATION

(71) Applicant: Microsoft Technology Licensing, LLC, Redmond, WA (US)

(72) Inventor: Congyong Su, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 609 days.

(21) Appl. No.: 15/343,582

(22) Filed: Nov. 4, 2016

(65) Prior Publication Data

US 2018/0129716 A1    May 10, 2018

(51) Int. Cl.
*G06F 16/00* (2019.01)
*G06F 16/248* (2019.01)
*G06F 16/901* (2019.01)
*G06F 16/9038* (2019.01)
*G06F 40/114* (2020.01)

(52) U.S. Cl.
CPC ........ *G06F 16/248* (2019.01); *G06F 16/9024* (2019.01); *G06F 16/9038* (2019.01); *G06F 40/114* (2020.01)

(58) Field of Classification Search
CPC ........................................................ G06F 16/30
USPC ......................................................... 707/722
See application file for complete search history.

(56) References Cited

U.S. PATENT DOCUMENTS

| | | | |
|---|---|---|---|
| 6,556,217 B1 | 4/2003 | Makipaa | |
| 7,412,647 B2 | 8/2008 | Sellers et al. | |
| 7,805,440 B2 | 9/2010 | Farrell et al. | |
| 9,122,768 B2 | 9/2015 | Sylthe et al. | |
| 10,235,417 B1* | 3/2019 | Sterin | ............... G06F 16/24568 |
| 2006/0056334 A1 | 3/2006 | Yuan et al. | |
| 2012/0130973 A1* | 5/2012 | Tamm | .................... G06Q 10/00 707/706 |
| 2014/0330818 A1 | 11/2014 | Raina et al. | |
| 2016/0224518 A1 | 8/2016 | Shankar | |
| 2017/0300552 A1* | 10/2017 | Mandadi | ............... G06F 16/273 |

FOREIGN PATENT DOCUMENTS

WO        2016138566 A1    9/2016

OTHER PUBLICATIONS

Noppens et al., "Realizing the hidden—Interactive Visualization and Analysis of Large Volumes of Structured Data", Mailed Date May 2, 2008, pp. 441-444.
"International Search Report and Written Opinion Issued in PCT application No. PCT/US2017/059627", Mailed Date May 2, 2018, 24 Pages.
"API Authentication (HTTP Basic)", http://web.archive.org/web/20151009071901/https:/dev.recurly.com/docs/pagination, Oct. 9, 2015, 269 pages.

(Continued)

*Primary Examiner* — Anhtai V Tran

(57) ABSTRACT

Examples of the present disclosure describe systems and methods for returning resources from an isolated collection in response to a query. In some instances, the results of the query may return a large number of resources. As such, the returned results may be paginated so that a select number of results are returned. When a subsequent query is executed on the isolated collection, one or more cursors or skip tokens are used to ensure a subsequent pagination of results may be returned.

20 Claims, 15 Drawing Sheets

(56) References Cited

OTHER PUBLICATIONS

Nimesh, Rakhitha, "Paginating Real-Time Data with Cursor Based Pagination", https://www.sitepoint.com/paginating-real-time-data-cursor-based-pagination/, Jul. 10, 2014, 17 pages.

"Using the Graph API", http://web.archive.org/web/20151019063005/https:/developers.facebook.com/docs/graph-api/using-graph-api/v2.4, Oct. 19, 2015, 12 pages.

"API Reference", https://stripe.com/docs/api, Oct. 14, 2016, 311 pages.

"Pagination", https://zalando.github.io/restful-api-guidelines/pagination/Pagination.html, Oct. 14, 2016, 3 pages.

Marchi, Giuseppe, "List Elements Pagination with Sharepoint 2013 Rest API—Part 1", http://www.dev4side.com/en/blog/posts/2014/04/10/list-elements-pagination-with-sharepoint-2013-rest-api-%E2%80%93-part-1, Apr. 10, 2014, 7 pages.

"API Resources", https://disqus.com/api/docs/cursors/, Oct. 14, 2016, 2 pages.

"Office Action Issued in European Patent Application No. 17798069.5", dated Jun. 23, 2020, 8 Pages.

* cited by examiner

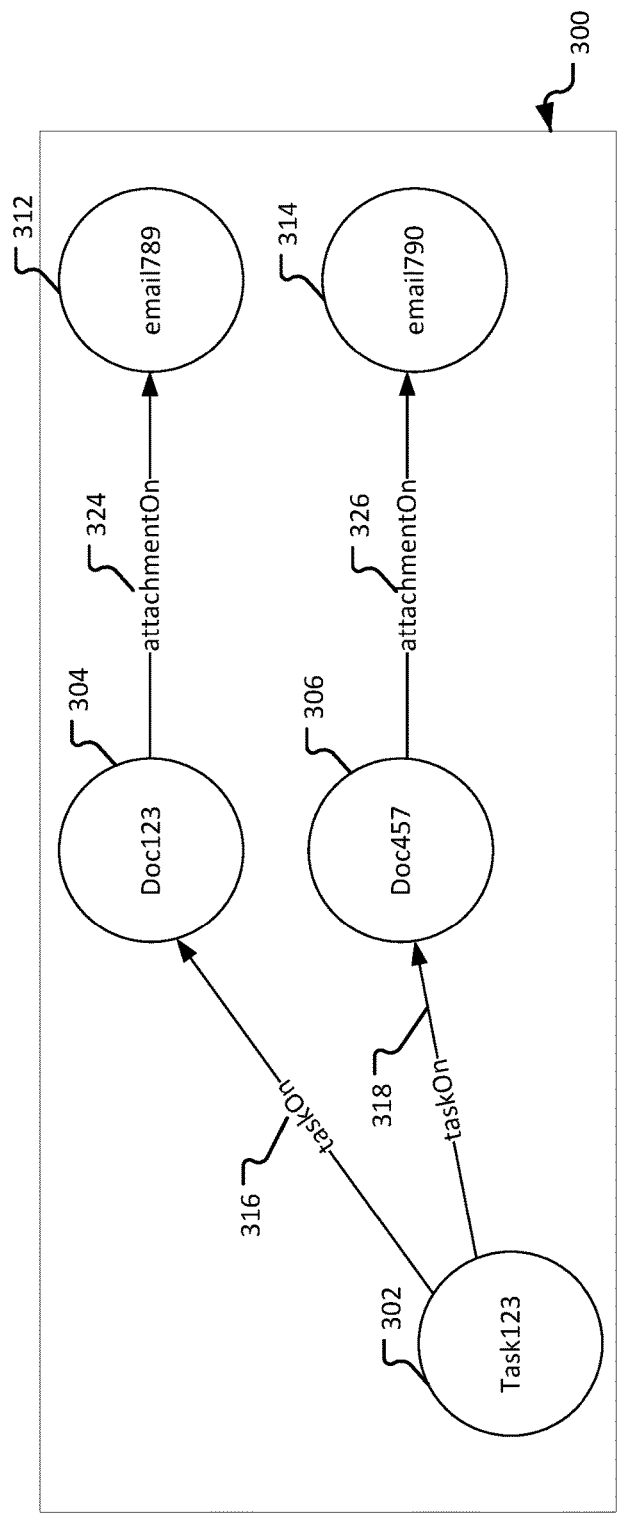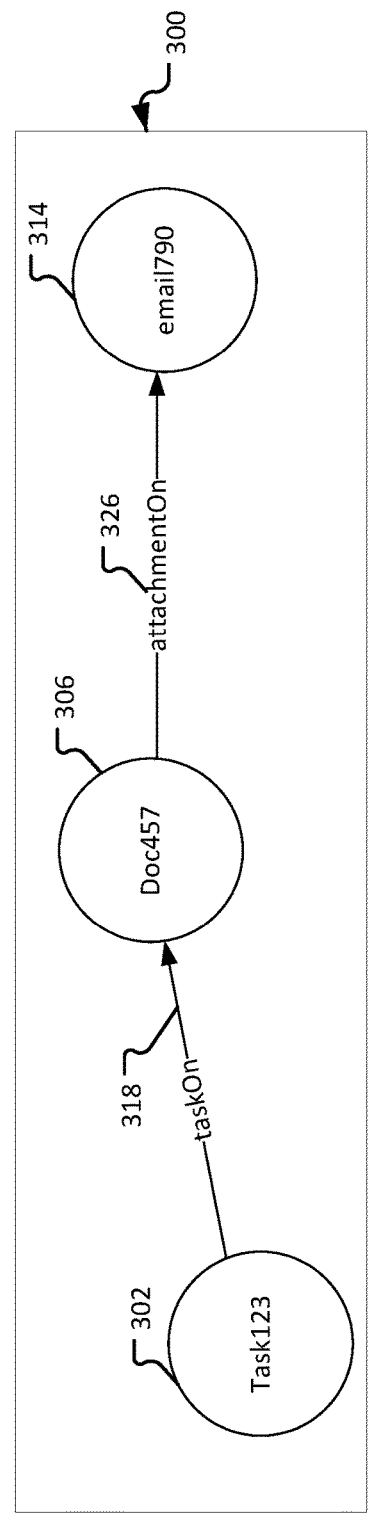
FIG. 3D
FIG. 3E
Query: http://.../set1/task123?$expand=taskOn($expand=attachmentOn)
Query: http://.../set1/task123?$expand=taskOn($expand=attachmentOn($filter=Subject eq 'Sets'))

500

Query: http://.../set1/Person1?$expand=hasFriend

510

```
{
        "ID" : "Person1",
        "hasFriend" : [
                { "ID" : "Person2" },
520     { "ID" : "Person3" },
                { "ID" : "Person4" }],
        "hasFriends@nextLink" : "http://.../set1/data?$skiptoken=opaque_string_1"
}
```

610  Query: http://.../set1/Person1?$expand=hasFriend($expand=purchased)

```
{
        "ID" : "Person1",
        "hasFriend" : [
                { "ID" : "Person2",
                        "purchased" : [
                                { "ID" : "Item1" }]
                },
                { "ID" : "Person3",
                        "purchased" : [
                                { "ID" : "Item2" },
                                { "ID" : "Item3" },
                620     { "ID" : "Item4" }],
                        "purchased@nextLink": "http://.../set1/data?$skiptoken=opaque_string_2"
                },
630     { "ID" : "Person4" }],
        "hasFriends@nextLink" : "http://.../set1/data?$skiptoken=opaque_string_1"
}
```

Query: http://.../set1/data?$skiptoken=opaque_string_2

```
{
  "value": [
     { "ID" : "Item5" }]
}
```

720

730

Query: http://.../set1/data?$skiptoken=opaque_string_1

```
{
  "value": [
     { "ID" : "Person5" },
     { "ID" : "Person6",
       "purchased" : [
          { "ID" : "Item6" },
          { "ID" : "Item7" },
          { "ID" : "Item8" }],
       "purchased@nextLink": "http://.../set1/data?$skiptoken=opaque_string_4"
     }],
  "@nextLink": "http://.../set1/data/?$skiptoken=opaque_string_3"
}
```

FIG. 7

1300
http://.../set1/data?$filter=id eq 'Person2' or id eq 'Person3'&$expand=*

1310
```
{
    "value" : [
        { "ID" : "Person2",
            "purchased" : [
                { "ID" : "Item1" }],
            "hasTask" : [
                { "ID" : "Task1" }]
        },
        { "ID" : "Person3",
            "purchased" : [
                { "ID" : "Item2" },
                { "ID" : "Item3" },
                { "ID" : "Item4" }],
            "purchased@nextLink" : "http://.../set1/data?$skiptoken=opaque_string_1"
        }]
}
```

FIG. 13

MULTI-LEVEL DATA PAGINATION

BACKGROUND

In some instances, data may be organized into or otherwise represented by a graph structure or a tree structure. In such cases, each node in the graph structure may be associated with additional nodes in the graph structure. Each of those nodes may, in turn, be associated with additional nodes. When a query is executed on the graph structure, the query may return a large amount of results and it may be impractical to return all of the results at the same time. However, if all the results are not returned at the same time, there is no way of knowing which data was returned and which data was not returned. Thus, when a subsequent query is executed on the graph or tree structure, duplicate results may be returned.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for paginating resources that are returned from a query executed on an isolated collection. For example, the systems and methods of pagination disclosed herein may be employed with a graph or tree structure. In some instances, the graph structure may be multi-dimensional. For example, a first node has a first relationship with a second node, a third node and a fourth node. Each of the second node, the third node and the fourth node may have a second relationship, that is different than the first relationship, with various additional nodes. Additionally, each of the second node, the third node and the fourth node may have a relationship with each other.

When a query is executed on such a graph structure, the results may be very large. For example, the results of the query may include not only the second node, the third node and/or the fourth node, but also the additional nodes that have the different relationship (e.g., the second relationship) with the second node, the third node, and the fourth node respectively. In cases where the results of the query are too large to return all at once, the results may be paginated or otherwise divided such that various chunks of data are returned in response to a query. However, due to the multi-dimensional nature of the graph structure, it is difficult to track which nodes were returned as a result of the query. Further, if a subsequent query is executed, the subsequent query should return results that were not returned in the first query.

Accordingly, disclosed herein is a cursor or skip token that is used in a graph structure to both paginate data and act as a starting point for subsequent queries that are executed on multi-dimensional graphs.

More specifically, disclosed herein is a system comprising at least one processor and a memory coupled to the at least one processor, the memory comprising computer executable instructions which, when executed by the at least one processor, performs a method for setting a first skip token and a second skip token (and subsequently more skip tokens) in an isolated collection. This method includes, among other features, receiving a query to access resources from the isolated collection. The query includes a first relationship associated with the resources and a second relationship associated with the resources. A determination is then made as to the number of resources to return as a result of the query. A first skip token is then associated with a first resource that is associated with the first relationship and a second skip token is associated with a second resource that is associated with the second relationship.

Also disclosed is a method for returning resources from an isolated collection. This method includes, among other features, receiving a query that identifies a first set of resources having a first relationship with a determined resource and a second set of resources having a second relationship with the determined resource. In some instances, the second set of resources is associated with the first set of resources by the second relationship. The method continues by identifying, from the first set of resources, a first subset of resources to return and associating a first cursor with at least one resource in the first set of resources. A second subset of resources from the second set of resources is then identified to return and a second cursor is associated with at least one resource in the second set of resources. The first subset of resources and the second subset of resources is then returned.

Embodiments of the present disclosure also describe an isolated collection of resources. The isolated collection of resources includes a resource, a first collection of resources associated with the resource by a first relationship and a second collection of resources associated with at least one resource in the first collection of resources. The second collection of resources is associated with the at least one resource by a second relationship. The isolated collection of resources also includes a first skip token associated with at least one resource in the first collection of resources and a second skip token associated with at least one resource in the second collection of resources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 3A-3E illustrate an example isolated collection.

FIG. 5 illustrates an example query and paginated results that may be returned when the query is executed on the isolated collection of FIG. 4.

FIG. 6 illustrates another example query and paginated results that may be returned when the query is executed on the isolated collection of FIG. 4.

FIG. 7 illustrates another example query and paginated results that may be returned when a query that is subsequent to the query shown in FIG. 6 is executed on the isolated collection of FIG. 4.

FIG. 13 illustrates another example query and the corresponding results in which multiple nodes are used as starting points for the query.

DETAILED DESCRIPTION

Figure 1:
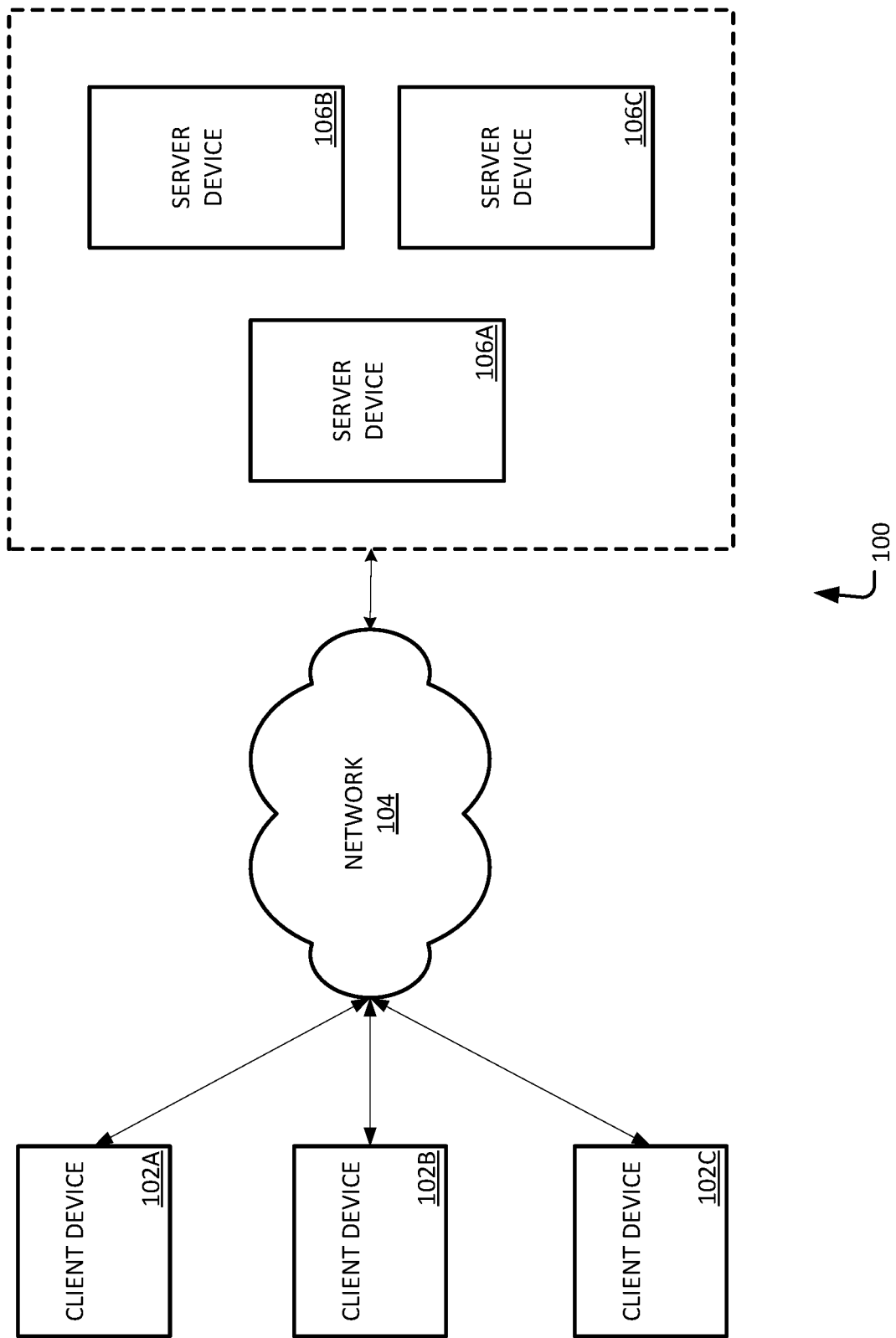
FIG. 1 illustrates an example system for paginating results returned from a query on an isolated collection.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

As described above, the present disclosure relates to paginating resources or other data that is returned from a query executed on an isolated collection of resources. In some instances, the isolated collection of resources may be multi-dimensional. As a result, the results of the query may also be multi-dimensional. For example, a query may include a request for data that has multiple levels of relationships with a starting node or resource. Although the examples provided herein disclose a single starting node or resource, a query may include multiple starting nodes or resources.

As will be explained in greater detail below, a starting node or resource may have a first relationship with a first set of nodes or resources. Each node or resource in the first set may have a second, different relationship with a one or more nodes or resources in a second set of resources. Thus, a query may be used to obtain the nodes or resources associated with the first relationship and the nodes or resources associated with the second relationship.

Because the results of the query may include resources with multiple levels of relationships, the results may be too large to efficiently provide to the end user or requesting device. As such, the returned results may be paginated. Accordingly, various cursors or skip tokens may be provided that indicate which resources, in each relationship level, were returned. Thus, if a subsequent query is executed, the subsequent query will return the next set of resources (e.g., those results that would have been returned but for the pagination) starting with the last visited or last returned resource.

Accordingly, the present disclosure provides systems and methods of generating and querying isolated collections of resources, or resource identifiers, and the relationships between those resources or resource identifiers. The present disclosure also describes how to paginate results of the query on the isolated collection of resources and tracking which resources or resource identifiers were returned.

The resources and/or relationships may be provided by a developer or other external source. The resources and relationships may also be inferred by executing a rule set against the isolated collection. Further, access to the isolated collection may be controlled through various techniques to provide additional security measures for the content in each isolated collection. As used herein, an isolated collection may be referred as a "Set."

FIG. 1 illustrates an example system for paginating results returned from a query on an isolated collection. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 9-12. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below.

Generally, the datasets are stored on one or more server devices 106A-C and are accessible by the client devices 102A-C. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may further be configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms.

In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
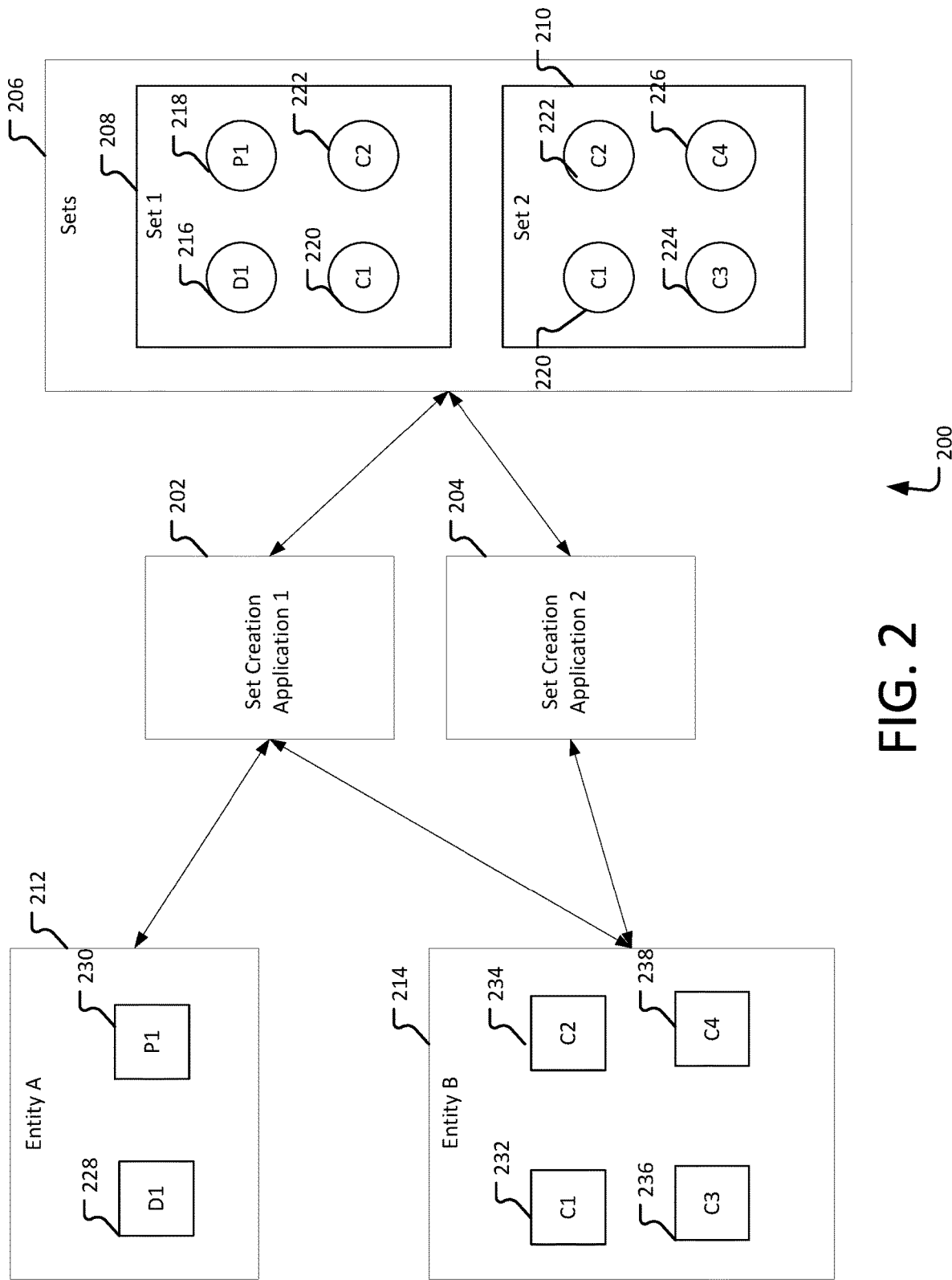
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, items, actions, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set.

In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rule sets. The isolated collections may be represented using graphical structures that directly relate resources in the data collection and provide for retrieving relationship data with a single operation. Each isolated collection may comprise resource identifiers that are unique to that isolated collection.

Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like.

One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers.

For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238.

In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202.

Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
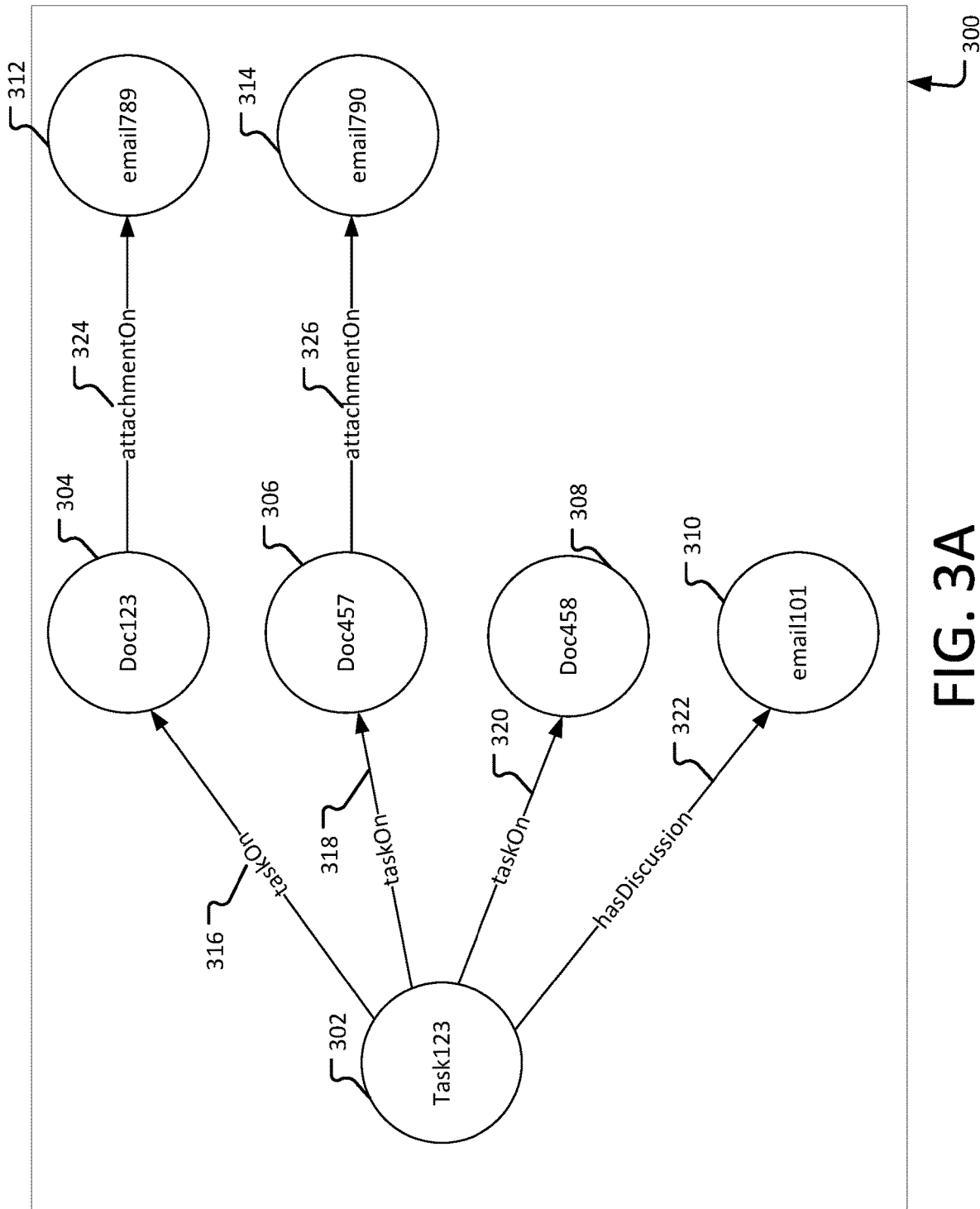

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge."

The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application.

For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resources identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308.

In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300.

Figure 3C:
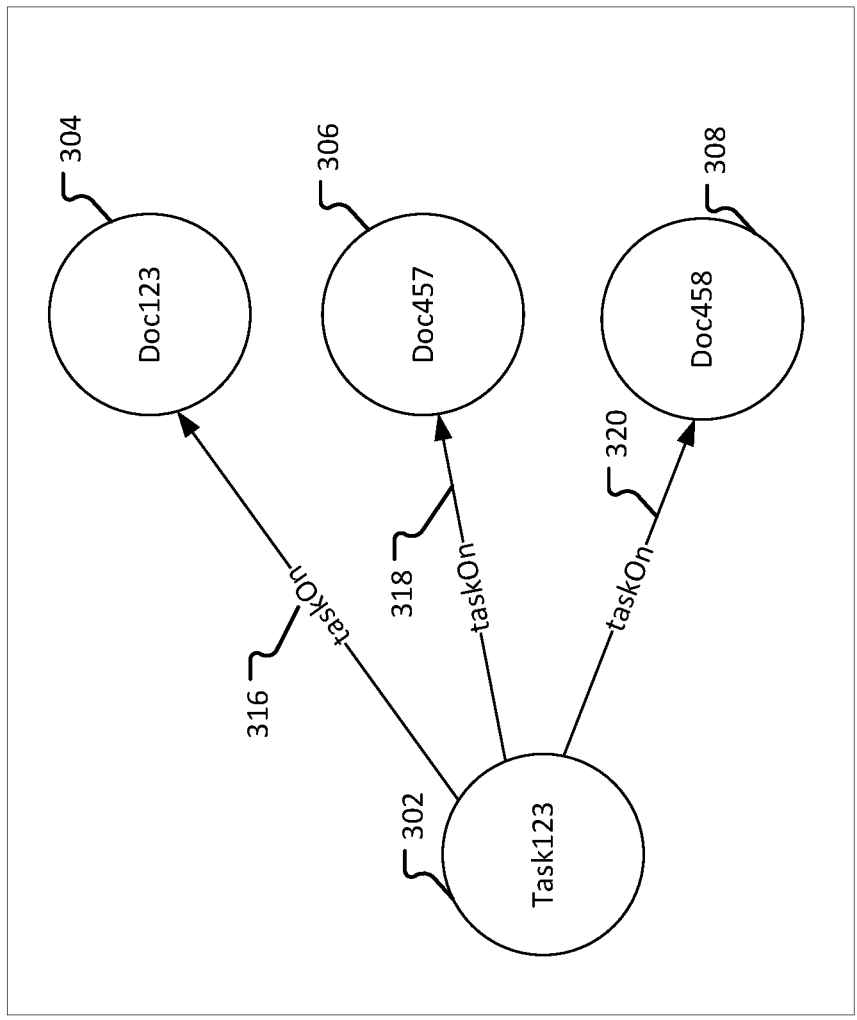
Figure 3B:

For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /set1/task123' may be executed against collection 300. The query results may comprise resource identifier 302 and be visualized as illustrated in FIG. 3B. In FIG. 3C, the query has been amended to 'http:// . . . /set1/task123?$expand=taskOn' and executed against collection 300. The query results may comprise resource identifiers 302, 304, 306 and 308 and relationships 316, 318 and 320, and be visualized as illustrated in FIG. 3C.

In FIG. 3D, the query has been amended to 'http:// . . . /set1/task123?$expand=taskOn($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to 'http:// . . . /set1/task123?$expand=taskOn($expand=attachmentOn ($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4:
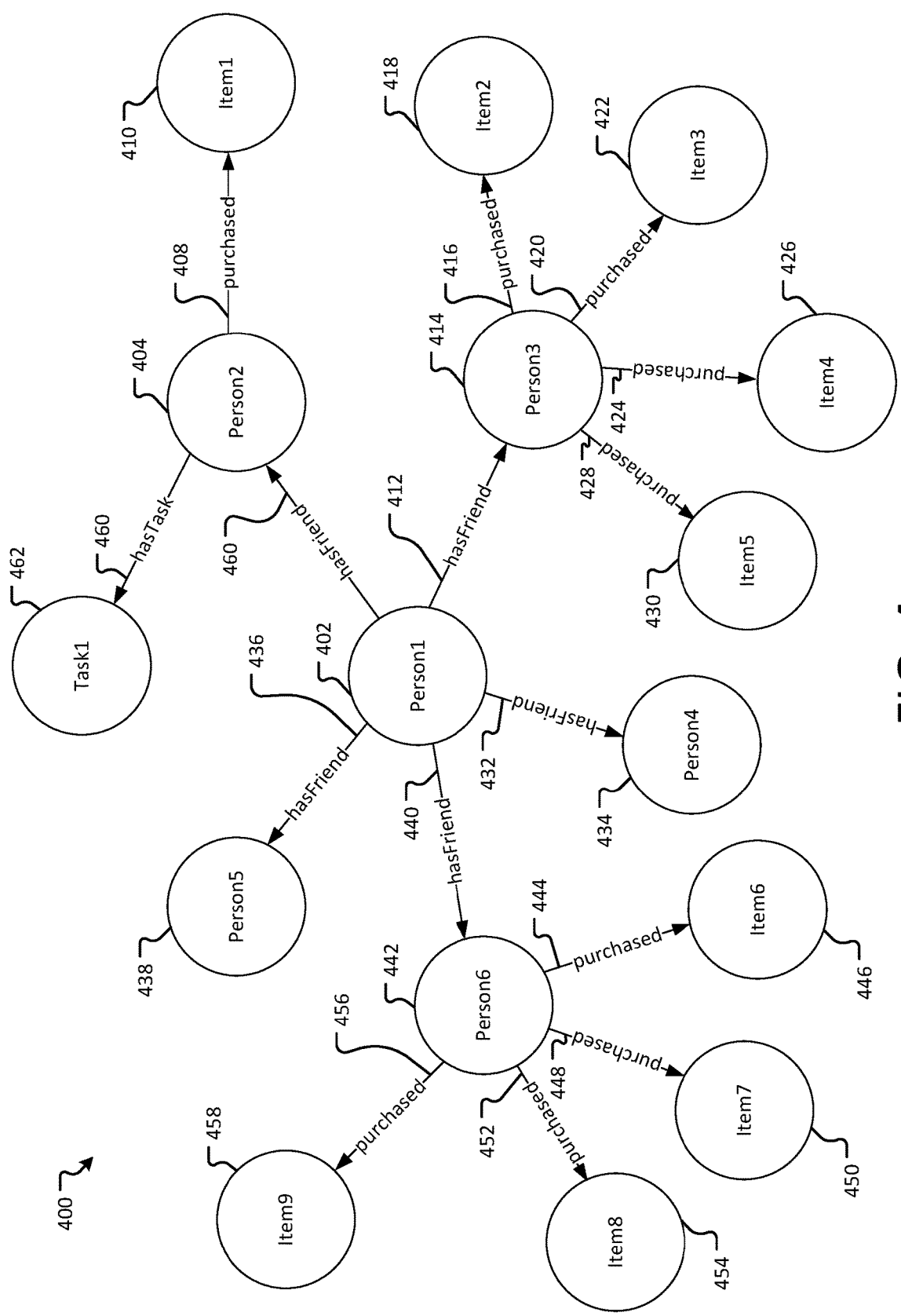
FIG. 4 illustrates an example isolated collection on which a query may be executed.

FIG. 4 illustrates an example isolated collection 400 on which a query may be executed. Like the isolated collection 300 described above with respect to FIG. 3, the isolated collection 400 includes various resource identifiers 402, 404, 410 414, 418, 422, 426, 430, 434, 438, 442, 446, 450, 454 and 458. Each of the resource identifiers 402, 404, 410 414, 418, 422, 426, 430, 434, 438, 442, 446, 450, 454 and 458 have a corresponding relationship 408, 412, 416, 420, 424, 428, 432, 436, 444, 448, 452, 456 and 460. For example, resource identifier 402 ("Person1") has a relationship 460 ("hasFriend") with resource identifier 404 ("Person2"). As also shown, the isolated collection 400 may have multiple levels or dimensions and each level can have multiple relationships. For example, resource identifier 404 ("Person2") has a relationship 408 ("purchased") with resource identifier 410 ("Item1"). In addition, Person2 can have another relationship (e.g., relationship 460 ("hasTask") with resource identifier 462 ("Task1")).

Each resource identifier represents an underlying resource. Thus, resource identifier 402 represents data or information corresponding to "Person1." Similarly, resource identifier 410 represents information about a product (e.g., "Item1"). Each of the resources and relationships included in the isolated collection 400 may have been asserted by a developer through a Sets creation application such as previously described.

Each resource identifier may be associated, in some way, with the other resource identifiers. In this example, a collection creation utility may determine that the resource identifier 402 ("Person1") has a relationship with resource identifiers 404 ("Person2"), 414 ("Person3"), 434 ("Person4"), 438 ("Person5") and 442 ("Person6"). Based on this determination, the collection creation utility may assign relationships 412, 432, 436, 440 and 460 (e.g., "hasFriend") to define this association.

Further, the various resource identifiers may have a second level, or dimension, of relationships. For example and as described above, resource identifier 404 has a relationship 408 ("purchased") with resource identifier 410 ("Item1"). Further, resource identifier 414 ("Person3") is associated (via relationships 416, 420, 424, and 428 ("purchased")) with resource identifiers 418 ("Item2"), 422 ("Item3"), 4426 ("Item4") and 430 ("Item5"). Each of the other resource identifiers may have relationships with various other resource identifiers such as shown. In yet other implementations, resource identifiers may have a multiple relationships. For example the resource identifier 404 associated with Person2 may have a relationship 460 "hasTask" with resource identifier 462 ("Task1") in addition to the "purchased" relationship 408.

Although not shown for purposes of clarity, it is contemplated that two or more resource identifiers may have a relationship with the same resource identifier or that a resource identifier may be provided in different subsets. For example, resource identifier 404 ("Person2") may be associated, via a relationship (e.g., "hasFriend") with resource identifier 414 ("Person3"). Likewise resource identifier 410 ("Item1") may be associated, via a relationship (e.g., "purchased") with resource identifier 404 ("Person2") and resource identifier 414 ("Person3").

Once the isolated collection 400 has been created, one or more queries may be performed on the isolated collection 400. However, due to the overall size of the isolated collection 400, not all of the resource identifiers, or their underlying resources, may be returned in response to the query. As such, the results may be paginated such that only various selections of the resource identifiers and/or their associated resources, are returned.

In order to ensure that resource identifiers and/or their associated resources, that were not included in the first pagination, may be returned in a subsequent query, one or more cursors or skip tokens may be generated and associated with specific resource identifiers in the various relationship levels of the isolated collection 400. As such, when a subsequent query is executed, the skip token or the cursor indicates the last visited node in the isolated collection 400 and the query can resume from that point.

For example and turning to FIG. 5, a query 500 may be executed on the isolated collection 400. In this example, the query 500 indicates that Person1 (e.g., resource identifier 402 shown in FIG. 4) is the entry identifier of the query 500. The query 500 also indicates that every resource identifier that has a specified relationship (e.g., "hasFriend") with Person1 should be returned. Thus, the result 510 of the query 500 shows that Person2 (resource identifier 404 of FIG. 4), Person3 (resource identifier 414 of FIG. 4) and Person4 (resource identifier 434 of FIG. 4) are returned.

As described above, there may be multiple relationships in a given level. A query that is executed on an isolated collection to return the multiple relationships may be look very similar to the query 500 shown in FIG. 5 However, in order to obtain each of the multiple relationships, the query 500 may be altered such that the "($expand=purchased)" portion of the query includes the second relationship (e.g., "($expand=purchased, hasTask)". As a result of adding the additional relationship, resource identifier 462 ("Task1") may be returned based on its relationship 460 with Person2.

Although Person1 (resource identifier 402) is also associated with Person5 (resource identifier 438 of FIG. 4) and Person6 (resource identifier 442 of FIG. 4), these resource identifiers and/or their associated resources, were not returned in this example. This could be due to various factors. For example, in some instances, the results of a query, such as query 500 may be too large to send to a requesting client device. In other examples, there may be a maximum specified number of results to return. In such cases, a determination may be made to paginate the returned results. In this case, the pagination begins after Person4.

However, the requesting client device may want to receive the additional data (e.g., the resource identifiers associated with Person5 and/or Person6). As such, a cursor or skip token is generated and associated with the last known visited node or resource identifier. In some implementations, the skip token may carry or otherwise be associated with additional information about specific query options for a given dimension. Thus, when a subsequent query is executed, the query may resume at the last known node or resource identifier and continue returning the results.

For example and referring back to FIG. 5, command 520 generates a skip token or otherwise causes a cursor to be associated with Person4 (resource identifier 434). Thus, if the query were to continue, the second paginated data (not shown) would return the resource identifiers and/or the resources associated with Person5 and Person6.

The isolated collection 400 on which a query is executed may be multi-dimensional. For example, a single resource identifier may have multiple levels of relationships with various other resource identifiers. Accordingly, a query may be executed that returns multiple levels of resource identifiers.

For example and turning to FIG. 6, a query 600 may be executed on an isolated collection, such as, for example, isolated collection 400. As shown in FIG. 6, the query 610 indicates that Person 1 (resource identifier 402 shown in FIG. 4) is the entry identifier. The query 600 also indicates that every resource identifier that has multiple levels of a specified relationship (e.g., "hasFriend" and "purchased") with Person1 should be returned.

The result 610 of the query 600 is also shown in FIG. 6. For example, the result 610 of the query 600 returns Person2 (resource identifier 404) as well as Item1 (resource identifier 410). As discussed above, Person2 is returned as a result of the relationship "hasFriend" and Item1 is returned as a result of the relationship "purchased."

The result 610 also includes Person3 (resource identifier 414) as well as Item2 (resource identifier 418), Item3 (resource identifier 422) and Item4 (resource identifier 426). The results also include Person4 (resource identifier 434).

However, as shown in FIG. 4, Person3 is also associated with Item5 (resource identifier 430) but this resource identifier was not returned in this example. As described above, Item5 may have been omitted due to pagination constraints associated with the results (e.g., only a certain number of resource identifiers can be returned and/or various size constrains on the returned data). Likewise, Person4 (resource identifier 434) was the last resource identifier returned even though Person1 is also associated with Person5 (resource identifier 438) and Person6 (resource identifier 442).

When the results from a query are paginated in such a way, one or more cursors or skip tokens are generated and associated with the last visited resource. However, in contrast to the cursor or skip token that was generated in FIG. 5, two different cursors or skip tokens are generated in this instance—one for each relationship level in the isolated collection. In some implementations, a cursor may be generated for each relationship instance. For example, a particular level may have two relationships (e.g., a "purchased" relationship and a "hasTask" relationship). In such instances, a cursor may be generated for each relationship.

For example, a first cursor or skip token is associated with the last known visited resource identifier in one relationship in a level and a second cursor or skip token is associated with the last known visited resource identifier in another relationship in the same level or in a different level. More specifically, a first cursor or skip token is generated by the command 620 that identifies the last resource identifier that was visited by the query 600 (e.g., the last resource identifier that was included in the returned results) in a particular relationship in a level. The skip token in this example is associated with Item4 in the "purchased" relationship as Item4 was the last node visited and/or returned by the query 600.

Likewise, command 630 is used to generate a second cursor or skip token. Like command 620, command 630 identifies the last resource identifier that was visited by the query 600 in the other relationship level. That is, the skip token or cursor generated by command 630 is associated with Person4 in the "hasFriend" relationship as Person4 was the last node visited and/or returned by the query 600. As discussed above, each cursor or skip token indicates what the end of the returned results (e.g., indicates a pagination break) and where results of a subsequent query should begin.

For example, and turning to FIG. 7, a subsequent query 700 may be received. The subsequent query 700 may cause the search results to begin at the skip token associated with the "purchased" relationship and return additional results 710. As shown in FIG. 7, the results 710 of the subsequent query 700 returns Item5 (resource identifier 430).

Likewise, a subsequent query 720 may be received and cause the search results to begin at the skip token associated with the "hasFriend" relationship. The subsequent query 720 may also return information from the second relationship level. For example, when subsequent query 720 is executed on the isolated collection 400, results 730 are returned. As shown in FIG. 7, the results 730 include Person5 (resource identifier 438) and Person6 (resource identifier 442). In addition, Item6 (resource identifier 446), Item7 (resource identifier 450) and Item8 (resource identifier 454) are also returned.

As shown in FIG. 7, since Item8 was the last resource identifier returned as a result of the subsequent query 720, Item8 is associated with a new skip token (e.g., using the command "purchased@nextLink": "http:// . . . /set1/data?$skiptoken=opaque_string_4". Likewise, the command "@nextLink": "http:// . . . /set1/data?$skiptoken=opaque_string_3" causes the cursor or skip token to be associated with the Person6, which is the last known visited node of the "hasFriend" relationship level. If another query is received, either one of the skip tokens may be used as a new starting point. As discussed above, if a particular level has multiple relationships, multiple skip tokens may be set in that level.

In some instances, both skip tokens may be used as starting points. For example, if another query was used to request additional results from the cursor associated with Item8, the only resource identifier left to return is resource identifier 458 which is associated with Item9 (see FIG. 4). In response, the new paginated data would return Item9. In addition, resource identifiers that were present in the isolated collection (e.g., Person7 (not shown)) in the first relationship level would also be returned, as would any resource identifiers that were associated with Person7 in a second relationship level (e.g., "purchased").

Figure 8:
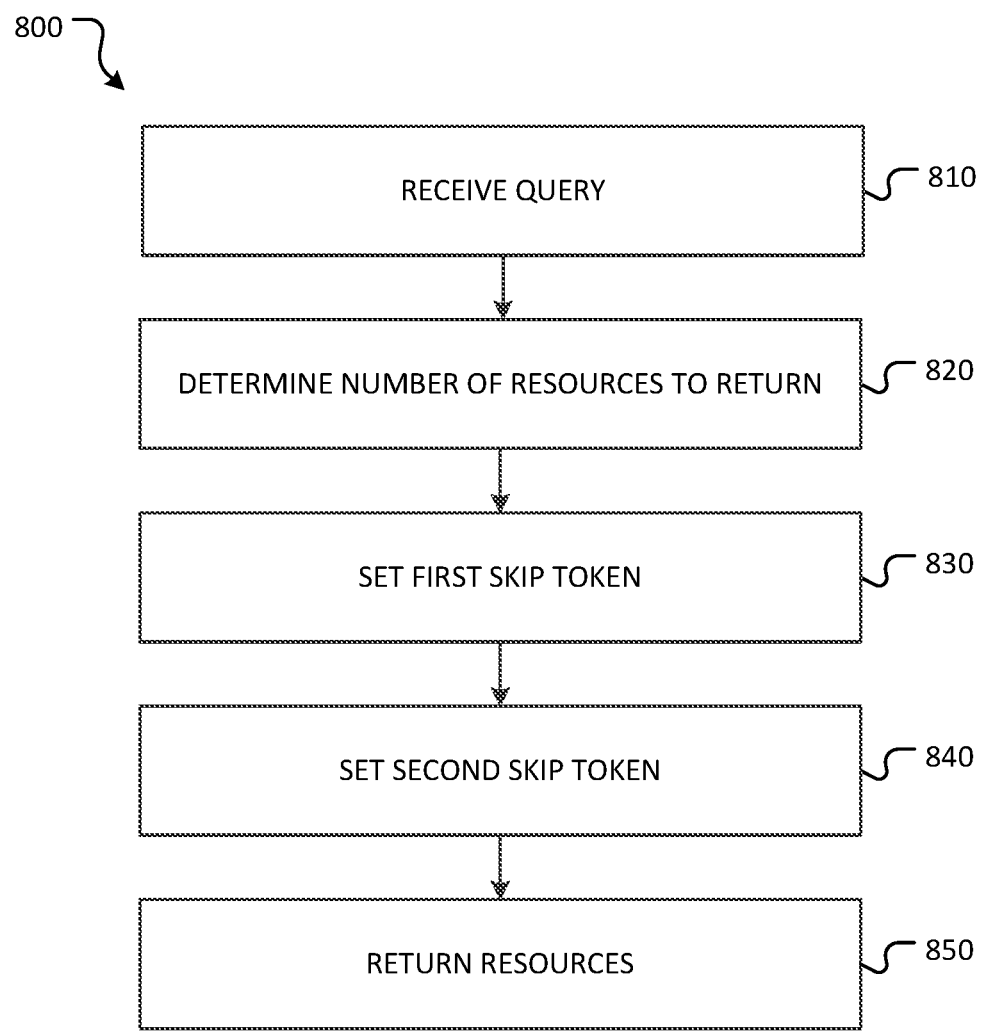
FIG. 8 is a method for setting one or more cursors or skip tokens for paginating results returned from a query on an isolated collection.

FIG. 8 illustrates a method 800 for setting one or more cursors or skip tokens for paginating results returned from a query on an isolated collection. In some embodiments, the method 800 may be used on isolated collection 400 shown and described with respect to FIG. 4. In addition, the method 800 may be used to return the results shown in FIG. 5, FIG. 6 and FIG. 7.

Method 800 begins at operation 810 in which a query is received. In some embodiments, the query may be a request for resource identifiers in a single relationship level or in multiple relationship levels.

Once the query is received, a determination is made as to the number of resources, or resource identifiers that may be returned. In some embodiments, this number may be determined by a size threshold. For example, n number of resource identifiers and/or resources may be returned so long as the combined size of the resources does not exceed a size threshold (e.g., 50 MB). In other implementations, the determination may be based on the actual number of number of resource identifiers and/or resources that are returned (e.g., 100). In yet another implementation, the size threshold can be determined by the target number of nodes per page. For example and returning to FIG. 4, Person6 (resource identifier 442) has four associated nodes (e.g., Item6, Item7, Item8, and Item9). If the size threshold (or page size) is set to 3, the first page for Person6 includes Item6, Item7, and Item8. The second page includes Item9.

Flow then proceeds to operation 830 in which a first skip token is generated and associated with a first resource identifier. In some embodiments, the first skip token is associated with the first resource identifier in a first relationship in a first level.

In operation 840, a second skip token is generated and associated with a second resource identifier. The second resource identifier may also be associated with a second relationship in the first level that is different than the first relationship in the same level. As such, each relationship level in the isolated collection may have an associated skip token. Although specific examples have been given, each level can have many skip tokens. Alternatively, a level may not have any skip tokens.

Flow proceeds to operation 850 and the results, up to the first skip token and/or the second skip token (and/or any additional skip tokens that may be present) are returned. As discussed above, if a subsequent query is received, the first skip token and the second skip token are used as delimiters to indicate new starting points for the subsequent query.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing aspects of the disclosure, described herein.

Figure 9:
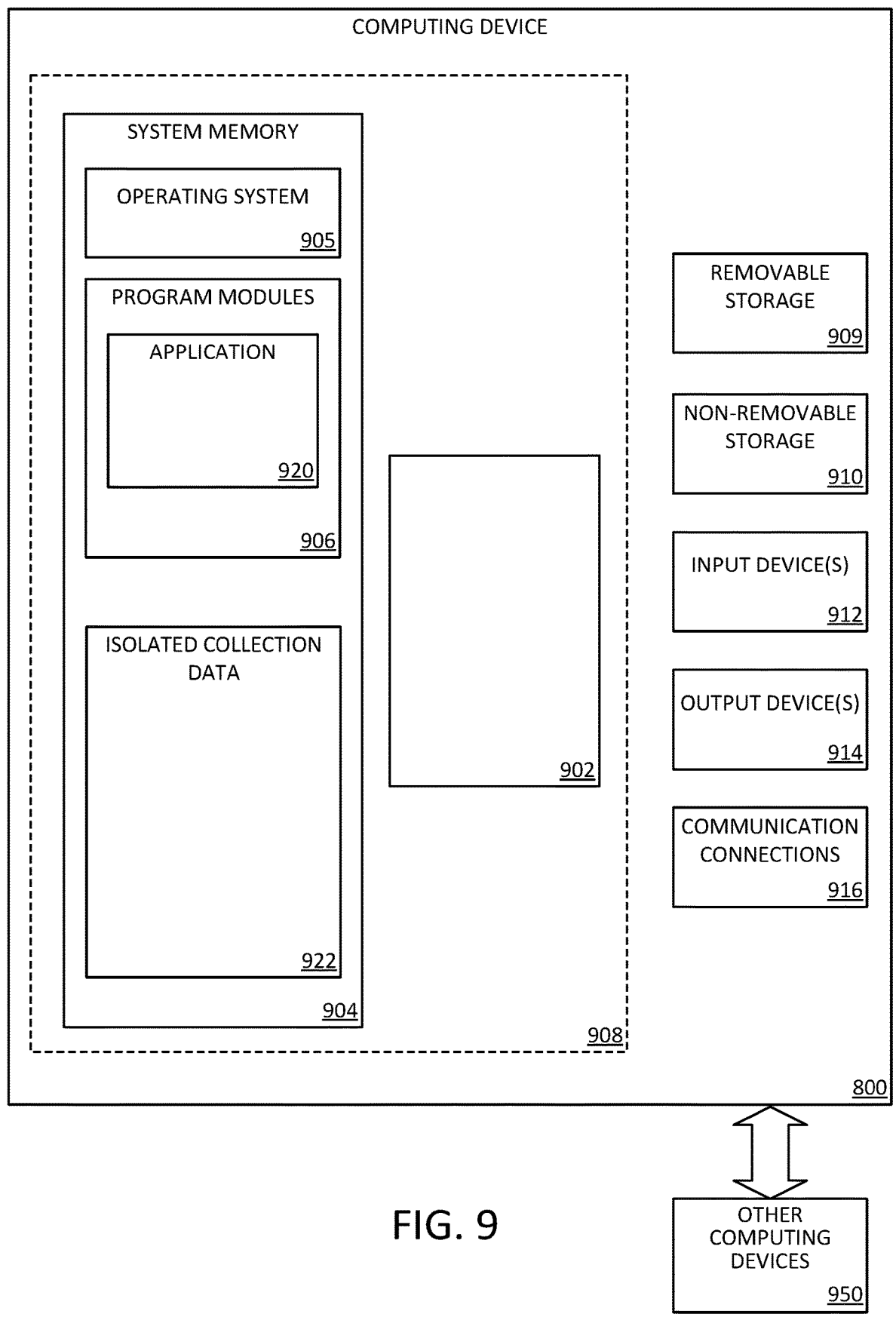
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices described above, including the client computing devices 102A-C and the server computing devices 106A-C. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store isolated collection data 922 (e.g., resource identifiers, resource metadata, relationship information, asserted/inferred relationships, graphical mapping information, query data, rule sets, such as, for example, inference rules, authorization information, authentication information, cursors, skip tokens and so on) and instructions for executing queries on isolated collections. The operating system 905, for example, may be suitable for controlling the operation of the computing device 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
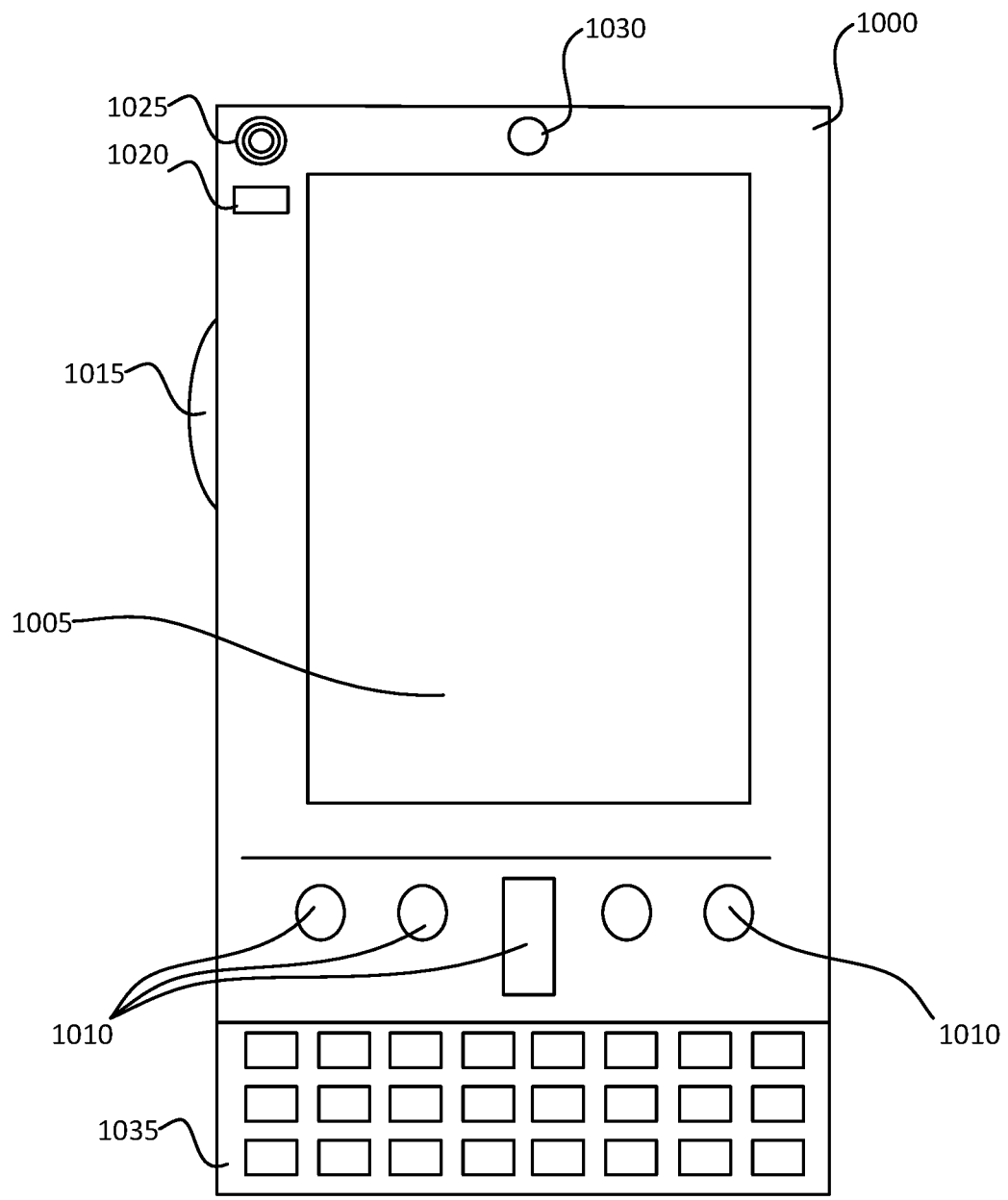
FIGS. 10A and 10B are simplified block diagrams of a mobile computing device with which aspects of the present disclosure may be practiced.
Figure 10B:
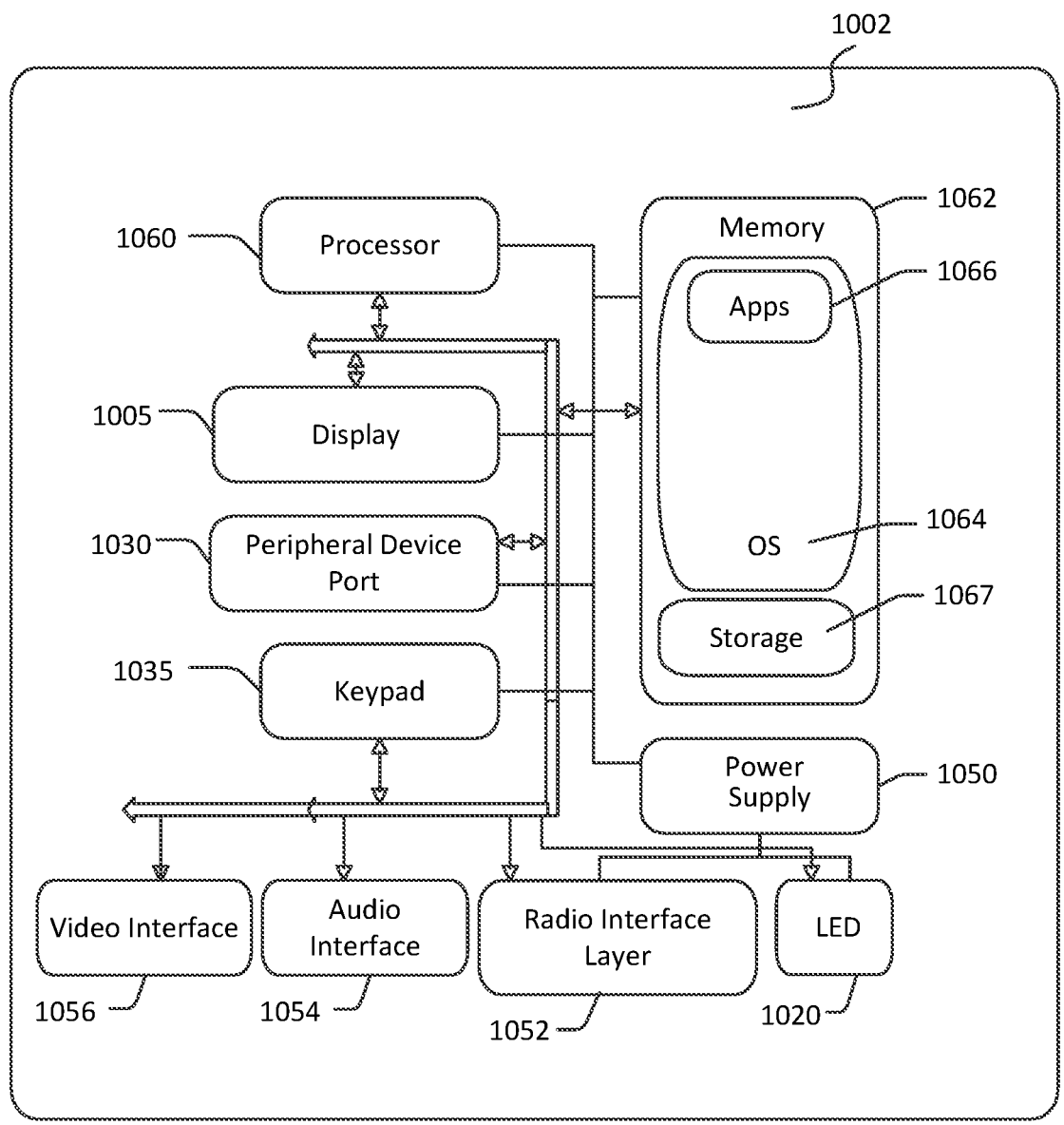

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments.

In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
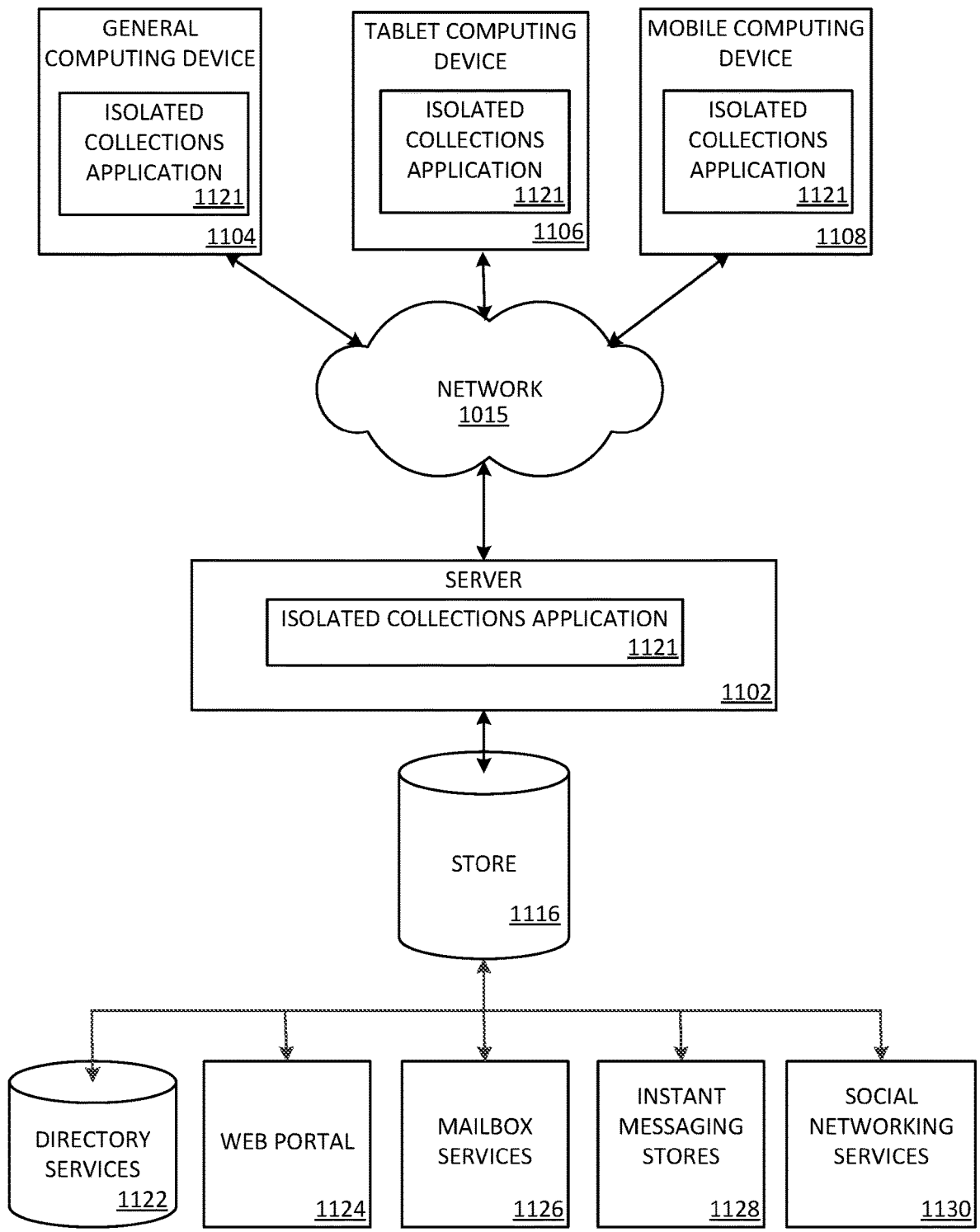
FIG. 11 is a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130.

An isolated collections application 1121 may be employed by a client that communicates with server device 1102, and/or the isolated collections application 1121 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Figure 12:
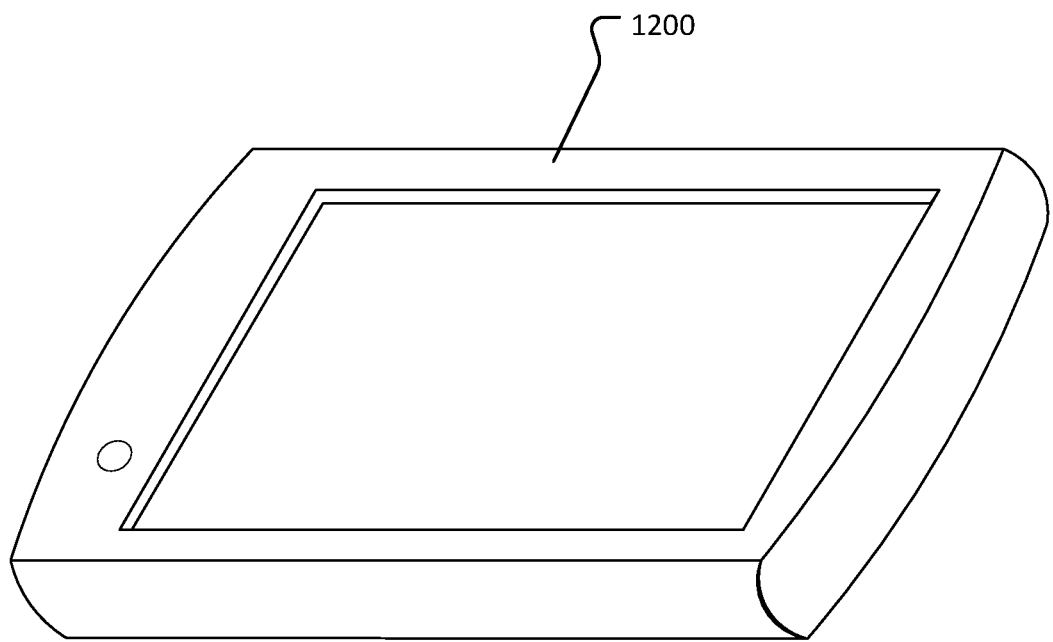
FIG. 12 illustrates a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As described above, a query may have a single starting node or resource or may have multiple different starting nodes or resources. FIG. 13 shows an example of a query 1300 that includes multiple starting nodes or resources as well as the results 1310 that are returned by the query 1300. In this example, the query 1300 may be executed on the example isolated collection 400 of FIG. 4. As shown in FIG. 13, the query 1300 includes starting nodes Person2 and Person3. The results 1310 of the query 1300 include information about Person2 and the "purchased" and "hasTask" relationships as well as Person3 and its corresponding "purchased" relationship.

In addition to the above, aspects of the present disclosure are directed to a system comprising: at least one processor; and a memory coupled to the at least one processor, the memory comprising computer executable instructions which, when executed by the at least one processor, performs a method for setting a first skip token and a second skip token in an isolated collection, comprising: receiving a query to access resources from the isolated collection, wherein the query includes a first relationship associated with the resources and a second relationship associated with the resources; determining a number of resources to return; associating the first skip token with a first resource that is associated with the first relationship; and associating the second skip token with a second resource that is associated with the second relationship. In further examples, the instructions further comprise instructions for returning the determined number of resources. In further examples, the first resource is not included in the determined number of resources. In further examples, the second resource is not included in the determined number of resources. In further examples, the instructions further comprise instructions for receiving a second query to access the resources from the isolated collection; and determining the number of resources to return starting from the first resource associated with the first skip token or the second resource associated with the second skip token. In further examples, each of the resources is associated with a resource identifier. In further examples, the instructions further comprise instructions for filtering the number of resources based, at least in part, on one or more received parameters.

In other aspects, a method for returning resources from an isolated collection is disclosed. The method comprises receiving a query that identifies a first set of resources having a first relationship with a determined resource and a second set of resources having a second relationship with the determined resource, wherein the second set of resources is associated with the first set of resources by the second relationship; identifying, from the first set of resources, a first subset of resources to return; associating a first cursor with at least one resource in the first set of resources; identifying, from the second set of resources, a second subset of resources to return; associating a second cursor with at least one resource in the second set of resources; and returning the first subset of resources and the second subset of resources. In other examples, the method comprises returning the first subset of resources comprises returning the at least one resource in the first set of resources that is associated with the first cursor. In other examples, the method comprises returning the second subset of resources comprises returning the at least one resource in the second set of resources that is associated with the second cursor. In other examples, the method further comprises filtering the first subset of resources and the second subset of resources. In other examples, the method further comprises receiving a second query; and determining the number of resources to return from at least one of the first set of resources starting from the first cursor and the second set of resources starting from the second cursor. In other examples, each resource in the first set of resources is associated with a resource identifier. In other examples, each resource in the second set of resources is associated with a resource identifier. In other examples, identifying, from the first set of resources, a first subset of resources to return comprises determining a number of resources to return. In other examples, the number of resources to return is based, at least in part, on a size of the resources. In other examples, identifying, from the second set of resources, a second subset of resources to return comprises determining a number of resources to return. In other examples the number of resources to return is based, at least in part, on a size of the resources.

In additional aspects, the present disclosure describes an isolated collection of resources, comprising: a resource; a first collection of resources associated with the resource by a first relationship; a second collection of resources associated with at least one resource in the first collection of resources, wherein the second collection of resources is associated with the at least one resource by a second relationship; a first skip token associated with at least one resource in the first collection of resources; and a second skip token associated with at least one resource in the second collection of resources. In other examples, at least one of the first skip token and the second skip token is used as a delimiter to identify a number of resources to return in response to a received query.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   at least one processor; and
   a memory coupled to the at least one processor, the memory comprising computer executable instructions that, when executed by the at least one processor, perform a method for setting a first skip token in an isolated collection in response to a single query, comprising:
   receiving a first request for the single query to access a plurality of resources from the isolated collection, wherein each of the plurality of resources is associated with a node of the isolated collection, and wherein the plurality of resources are associated by multiple levels of relationships comprising at least a first relationship level and a second relationship level;
   returning a first subset of the plurality of resources as a result of the first request for the single query, wherein the first subset of resources is associated with the first relationship level of the multiple levels of relationships;
   associating the first skip token with a first resource of the first subset of resources associated with the first relationship level, wherein the first resource corresponds to a last node at the first relationship level of the isolated collection visited in response to the first request for the single query;
   in response to the first request for the single query, returning at least the first subset of resources associated with the first relationship level and not a second subset of resources associated with the second relationship level of the plurality of resources; and
   in response to a second request for the single query, identifying the first skip token and returning at least the second subset of resources associated with the second relationship level and not the first subset of resources associated with the first relationship level of the plurality of resources.

2. The system of claim 1, further comprising instructions for returning the second subset of resources associated with the second relationship level of the plurality of resources.

3. The system of claim 1, further comprising instructions for:

in response to the second request for the single query, returning the second subset of resources starting from the first resource associated with the first skip token; and associating a second skip token with a second resource of the second subset of resources associated with the second relationship level, wherein the second resource corresponds to a last node at the second relationship level of the isolated collection visited in response to the second request for the single query.

4. The system of claim 1, wherein each of the plurality of resources is associated with a resource identifier.

5. The system of claim 1, further comprising instructions for filtering the plurality of resources based, at least in part, on one or more received parameters.

6. The system of claim 1, wherein the first resource is not included in the second subset of resources associated with the second relationship level of the plurality of resources.

7. The system of claim 1, wherein a second resource is not included in the first subset of resources associated with the first relationship level of the plurality of resources.

8. A method for returning resources from an isolated collection, comprising:
receiving a first request for a single query that identifies a first set of resources having a first relationship with a determined resource and a second set of resources having a second relationship with the determined resource, wherein the second set of resources is associated with the first set of resources by the second relationship, and wherein each resource of the first set of resources and the second set of resources is associated with a node of the isolated collection;
identifying, from the first set of resources, a first subset of resources to return;
associating a first cursor with at least a first resource in the first subset of resources, wherein the first resource corresponds to a last node visited in response to the first request for the single query;
identifying, from the second set of resources, a second subset of resources to return;
associating a second cursor with at least a second resource in the second subset of resources, wherein the second resource corresponds to a last node visited in response to a second request for the single query;
in response to the first request for the single query, returning the first subset of resources and the second subset of resources; and
in response to the second request for the single query, identifying the first cursor and returning at least one resource of the first set of resources that was not returned with the first subset of resources.

9. The method of claim 8, wherein returning the first subset of resources comprises returning at least the first resource in the first subset of resources that is associated with the first cursor.

10. The method of claim 8, wherein returning the second subset of resources comprises returning at least the second resource in the second subset of resources that is associated with the second cursor.

11. The method of claim 8, further comprising filtering the first subset of resources and the second subset of resources.

12. The method of claim 8, further comprising:
in response to the second request for the single query, returning one or more resources from at least one of the first set of resources starting from the first cursor or the second set of resources starting from the second cursor.

13. The method of claim 8, wherein each resource in the first set of resources is associated with a resource identifier.

14. The method of claim 8, wherein each resource in the second set of resources is associated with a resource identifier.

15. The method of claim 8, wherein identifying, from the first set of resources, a first subset of resources to return comprises determining a number of resources to return.

16. The method of claim 8, wherein identifying, from the second set of resources, a second subset of resources to return comprises determining a number of resources to return.

17. The method of claim 15, wherein the number of resources to return is based, at least in part, on a size of the resources.

18. The method of claim 16, wherein the number of resources to return is based, at least in part, on a size of the resources.

19. A computer storage media storing computer-executable instructions that when executed cause the processor to perform operations, comprising:
receiving a first request for the single query to access a plurality of resources from the isolated collection, wherein each of the plurality of resources is associated with a node of the isolated collection, and wherein the plurality of resources are associated by multiple levels of relationships comprising at least a first relationship level and a second relationship level;
returning a first subset of the plurality of resources as a result of the first request for the single query, wherein the first subset of resources is associated with the first relationship level of the multiple levels of relationships;
associating a first skip token with a first resource of the first subset of resources associated with the first relationship level, wherein the first resource corresponds to a last node at the first relationship level of the isolated collection visited in response to the first request for the single query;
in response to the first request for the single query, returning at least the first subset of resources associated with the first relationship level and not a second subset of resources associated with the second relationship level of the plurality of resources; and
in response to a second request for the single query, identifying the first skip token and returning at least the second subset of resources associated with the second relationship level and not the first subset of resources associated with the first relationship level of the plurality of resources.

20. The computer storage media of claim 19, wherein the first skip token is used as a delimiter to identify a number of resources to return in response to the single query.

* * * * *